United States Patent [19]

Bentham

[11] Patent Number: 4,627,941

[45] Date of Patent: Dec. 9, 1986

[54] GAS/LIQUID CONTACTING APPARATUS

[75] Inventor: Jeremy B. Bentham, Amsterdam, Netherlands

[73] Assignee: Shell Oil Company, Houston, Tex.

[21] Appl. No.: 854,056

[22] Filed: Apr. 18, 1986

Related U.S. Application Data

[63] Continuation of Ser. No. 711,873, Mar. 14, 1985, abandoned.

[30] Foreign Application Priority Data

Mar. 14, 1984 [GB] United Kingdom ............... 8406634

[51] Int. Cl.⁴ ............................................. B01F 3/04
[52] U.S. Cl. ............................... 261/109; 261/114 R; 261/114.1
[58] Field of Search ........................... 261/114 R, 109

[56] References Cited

U.S. PATENT DOCUMENTS

| | | | |
|---|---|---|---|
| 2,222,565 | 11/1940 | Kraft | 261/114 R |
| 2,247,485 | 7/1941 | Edmister et al. | 261/114 R |
| 2,394,679 | 2/1946 | Gerhold | 261/114 R |
| 2,684,837 | 7/1954 | North et al. | 261/114 R |
| 3,197,286 | 7/1965 | Farkas et al. | 261/114 R |
| 3,972,966 | 8/1976 | Lund et al. | 261/114 R |

FOREIGN PATENT DOCUMENTS

| | | | |
|---|---|---|---|
| 0092262 | 10/1983 | European Pat. Off. | 261/114 R |
| 764103 | 3/1953 | Fed. Rep. of Germany | 261/114 R |

*Primary Examiner*—Tim Miles

[57] ABSTRACT

Gas/liquid contacting apparatus comprising a vertical column with a plurality of substantially horizontal trays arranged one above the other in the column, each tray having a plurality of apertures for ascending gas and at least one discharge device for descending liquid, the discharge devices being open at their upper ends and extending at least partly below the relevant trays, the parts of the liquid discharge devices extending below the trays being provided with liquid discharge openings, wherein the liquid discharge devices are each provided with a gas passage having at least one gas entry arranged in the lower part of the discharge device and having a gas outlet arranged substantially above the upper end of the discharge device.

7 Claims, 3 Drawing Figures

GAS/LIQUID CONTACTING APPARATUS

This is a continuation of application Ser. No. 711,873 filed Mar. 14, 1985, now abandoned.

BACKGROUND OF THE INVENTION

The invention relates to a gas/liquid contacting apparatus comprising a column having its interior provided with perforated gas/liquid contacting trays for effecting intimate contact between liquid and gas flowing counter-currently through said column.

More in particular, the present invention relates to a gas/liquid contacting apparatus comprising a normally vertically extending column having a plurality of substantially horizontal trays arranged one above the other in the column, each tray having a plurality of apertures for the passage of ascending gas and at least one discharge device for descending liquid, the discharge devices being open at their upper ends and extending at least partly below the relevant trays, the parts of the discharge devices extending below the relevant trays being provided with liquid discharge openings. In operation, liquid is introduced at the top of the column and the gas phase at the bottom of the column, so that the difference in density constitutes a driving force causing the liquid and the gas to flow through the column. The trays define a series of contacting zones wherein the liquid and the gas are brought together in intimate admixture for contacting.

The term "gas" as used throughout this specification and the claims is to be understood to include vapor.

Apparatuses of the above-mentioned type may be suitably used for carrying out processes like distillation, absorption and stripping. Examples of trays which may be applied in such an apparatus are grid trays, sieve plate trays which are formed of plates that are punched or otherwise fabricated to have circular or other apertures for gas passage, and valve trays which are sieve trays provided with valves which are displaceably arranged in the tray-apertures. Liquid is transferred from one tray level to another via liquid discharge means, hereinafter called downcomers, mounted in openings of the trays. The liquid discharge openings in the lower parts of the downcomers are so arranged that these openings are properly sealed against upward flow of gas during operation of the column. The downcomers normally extend partly above the relevant trays to establish a liquid level on the trays in the contacting zones.

If the contacting trays are to accomplish their mass transfer function efficiently they should be supplied with de-aerated liquid from the tray above in order to minimize vapor back-mixing between the contacting zones. The downcomers in which the liquid from the contacting zones is collected should allow the separation of the liquid and gas phases within them.

The maximum capacity of a column provided with contacting trays having liquid downcomers is reached when either the dispersion of liquid and gas fills the whole space between adjacent trays, resulting in flooding of the column, or when the pressure drop over the trays can no longer be balanced by the liquid holdup in the downcomers, also resulting in flooding of the column.

Within the oil and gas industries there are a number of operations involving counter-current gas/liquid contacting under conditions of high gas density and low interfacial tension between the liquid phase and the gas phase, for example, fractionation near the critical region. These have traditionally been a source of concern with regard to both capacity and operational stability. Over a wide range of conditions it has been found that for a given liquid flow rate, the maximum possible gas loading through a given tray is determined from a constant maximum load factor. High pressure operation, however, may cause a sharp decrease of the load factor at maximum capacity, due to a decrease of the density differences between the fluid phases.

The object of the invention is to provide a gas/liquid contacting apparatus which is suitable for high pressure operation in that the adverse influence of high pressure on the maximum capacity of the apparatus is eliminated or at least minimized.

SUMMARY OF THE INVENTION

The gas/liquid contacting apparatus according to the invention thereto comprises a normally vertically extending column having a plurality of substantially horizontal trays arranged one above the other in the column, each tray having a plurality of apertures for the passage of ascending gas and at least one discharge device for descending liquid, the discharge devices being open at their upper ends and extending at least partly below the relevant trays, the parts of the liquid discharge devices extending below the trays being provided with liquid discharge openings, the apparatus being characterized in that the liquid discharge devices are each provided with a gas passage having at least one gas entry arranged in the lower part of the discharge device and having a gas outlet arranged substantially above the upper end of the discharge device.

DESCRIPTION OF PREFERRED EMBODIMENTS

Figure 1:
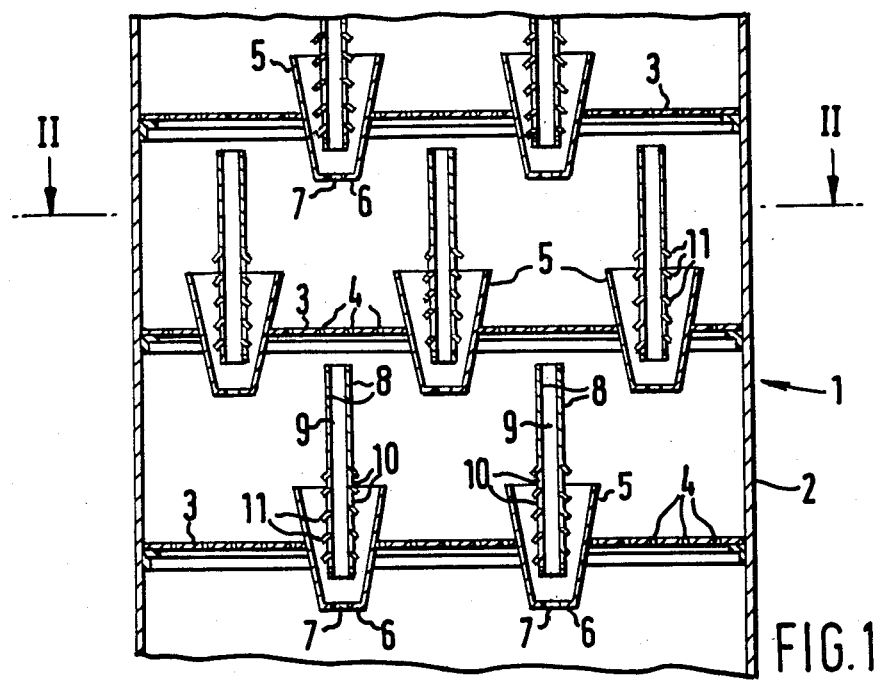
FIG. 1 shows a vertical section of an intermediate part of a trayed column according to the invention.

During operation of the above proposed apparatus gas collected in the liquid discharge devices also called downcomers, is allowed to escape via the gas passages to the gas zones above the trays.

The principle of venting entrained gas from the downcomers in trayed columns is well known as such and is described in, for example, U.S. Pat. No. 2,247,485. The known venting systems, however, are only suitable for moderate pressure operations and fail to provide substantial benefits at high pressure operations where the density differences between liquid and gas have become small. In the known venting systems entrained gas is discharged from the downcomers at a level directly adjacent the bottom of the weirs of the downcomers. The weirs are to be understood as those parts of downcomer sidewalls extending above the trays. Such vent systems relieve the pressure which can build up between the liquid flow into the downcomers and the weirs at very high liquid loads. This pressure built up is normally denoted with the expression "pressure under the nappe of the weir". Such a vent system for relieving the pressure under the nappe is effective for increasing the maximum liquid load at low and moderate pressure operations. At low and moderate pressures, liquid falls over the weirs of the downcomers under gravity while substantially not being hampered by the gas. The liquid throw over the weir increases with increasing liquid flow rate, and eventually reaches an opposite wall, which may be the column wall or the opposite side of the downcomer depending on the location of the downcomer. At low liquid rates there is ample downcomer cross section for removal of disengaged gas. As the liquid rate is increased the space available for upwardly flowing disengaged gas is reduced to pockets of cross section which become available in a random manner. Eventually, the entry side of the downcomer is completely closed, and a buildup of pressure due to disengaged gas between the liquid flow and the downcomer sidewall takes place. This pressure under the nappe forces the liquid flow upward and has the effect of increasing the required head on the weir. By venting the gas causing the pressure under the nappe a lower liquid level may be maintained over the weir thereby effectively increasing the liquid capacity compared to an unvented system.

At high pressures the behavior in the downcomers is, however, quite different from the one described above. At low and moderate pressures the drag forces on the liquid droplets entering into the downcomers is relatively low and the liquid is substantially not hampered in their downward flow by the stationary gas in the downcomers. As, however, the gas density increases and the surface tension between liquid and gas decreases, the drag forces become more important. As an absolute limit, the maximum throughput of a column may well be determined by the point at which the gas velocity becomes equal to the maximum liquid terminal falling velocity. This is the reason why the capacity of liquid/liquid columns is often correlated with the terminal velocity of the dispersed liquid phase. If the drag forces are sufficiently high, the liquid droplets very quickly reach their terminal falling velocity. The flow in the upper, liquid-dispersed, regions of the downcomers may be approximately described by the following equation:

$$\frac{U_{dc}}{\alpha_d} - \frac{U_g}{1-\alpha_d} = (1-\alpha_d)V_{d\infty}$$

where $U_{dc}$ = superficial downcomer liquid velocity =

$$\frac{\text{volumetric amount of liquid per unit time}}{\text{total cross - sectional area of the downcomer}}$$

$U_g$ = superficial downcomer vapor velocity
$V_{d\infty}$ = liquid droplet terminal fall velocity
$\alpha_d$ = dispersed (liquid) phase volume fraction
Setting $U_g=0$ for no vapor carry under, the following simplified equation can be written: $U_{dc}=\alpha_d(1-\alpha_d)V_{d\infty}$. For constant $V_{d\infty}$, this equation predicts that $U_{dc}$ is maximized if $\alpha_d$ is equal to 0.5. If $\alpha_d=0.5$ then $U_{dc}=0.25\ V_{d\infty}$ for no vapor carry-under. From this equation it seems likely that substantial vapor carry-under will occur if $U_{dc}/V_{d\infty}$ is greater than 0.25. Experiments have been carried out in which the liquid fraction was measured at the bottom of a downcomer for a wide range of high pressure systems. From these experiments it could be seen that the expression above indicates the onset of substantial vapor carry-under rather well.

It has now been discovered by Applicant that the maximum downcomer liquid load in high pressure gas/liquid contact columns can be made largely independent from the gas pressure by allowing some gas to flow with the liquid into the downcomers and venting the gas at a lower level from the downcomers. In this way the gas and the liquid flow co-currently in the upper part of the downcomer, thus substantially reducing the resistance to the flow of liquid. It will be understood that the gas should preferably be removed from the downcomers at a level as low as possible, closely adjacent to the liquid level during operation of such a column.

Referring to FIG. 1, part of a normally vertically extending column 1 with cylindrical sidewall 2 is shown. The column is provided with a plurality of substantially horizontal contact trays 3 arranged one above the other at suitable intervals, e.g. 150 to 750 mm, and extending over substantially the whole cross section of the column. Each of the trays 3 is provided with a plurality of apertures 4 forming passages for upward flowing gas. These apertures 4 are substantially uniformly distributed over the trays and may have any suitable shape, such as slits and circular holes. The apertures are further of substantially uniform size throughout and are spaced apart from each other to provide an aggregate area, that is the free area of the trays, appropriate to the loading conditions at which the column is to be operated. The portions of the trays 3 with the apertures 4 for the passage of gas constitute the active areas of the trays 3, i.e. above these areas liquid and gas introduced into the column are intensively mixed with each other for the exchange of matter and/or heat between said two fluid phases.

Adjoining the active tray areas there is on each tray 3 a plurality of oblong downcomers 5 for descending liquid. The downcomers pass through the trays to a predetermined height above the upper surfaces of said trays and a predetermined distance below their lower surfaces. The part of a downcomer extending above the tray is normally indicated with the expression weir. The downcomers are open at their upper ends, while their lower ends are formed by bottomwalls 6 provided with a plurality of liquid discharge openings 7. The liquid discharge openings 7 are distributed over the bottomwalls 6 of the downcomers 5 so as to discharge liquid substantially uniformly over the length of said downcomers. The aggregate area of the liquid discharge openings 7 in each downcomer 5 should be sufficient for discharging all of the liquid flowing downwards through the column interior at the intended liquid loading and should be restricted with respect to the horizontal cross sectional areas of the lower parts of the downcomers so as to maintain during operation of the column in said downcomers a column of liquid exerting at the liquid discharge openings 7 a hydrostatic head which is sufficient for preventing ascending gas from entering into the downcomers via said openings 7. The downcomers are further provided with splashing baffles to prevent the flow of liquid from one side of a downcomer to the active tray area at the opposite side of the downcomer. These splashing baffles consist of two substantially vertical, parallel walls 8 arranged at some distance from one another to form a passage 9. The upper ends of the walls 8 should preferably extend above the froth of liquid and gas formed above the trays upon operation of the column at maximum capacity. It is advisable to have the upper ends of the walls 8 arranged closely to the lower surface of the next upper tray 3 above the froth generated above the trays at maximum loading of the column. The distance between the walls 8 should be chosen such that the velocity of upward flowing gas is relatively small so that liquid entrained with the gas is separated from the ascending gas by gravity flow. Each pair of parallel walls is preferably substantially coaxially arranged with respect to the downcomer in which the walls are located. The parallel walls may be connected to the downcomer walls by any suitable means such as supporting strips (not shown). The parallel walls 8 are further provided with a plurality of vertically spaced apart slit shaped openings 10 for the passage of gas. To prevent entry of liquid into these openings 10, downwardly inclined baffles 11 are secured to the walls adjacent to said openings.

During operation of the column partly shown in FIG. 1, gas and liquid are caused to flow in countercurrent direction, in such a manner that gas flows in upward direction via the openings 4 in the trays 3, while liquid descends through the column via the downcomers 5. At low pressures the liquid from the froth formed above the trays will substantially not be hindered by gas upon entry into the downcomers 5. If the column is operated at elevated pressure the density difference between gas and liquid decreases, so that the drag forces on the liquid droplets become more important. As a consequence of the reduction in terminal falling velocity of the liquid droplets, the liquid-handling capacity of the downcomer is decreased if no specific measures as proposed in the present application are taken. As already discussed in the above, the increased resistance to liquid flow may lead to premature flooding of the column. Furthermore, even at lower than maximum loading the liquid droplets will form a barrier resisting the upward flow of entrained gas. A consequence thereof would be the passage of gas with liquid through the downcomer openings, which phenomenon is usually indicated with the expression vapor carry-under.

On account of the arrangement of the parallel walls 8 in the downcomers 5 the above problem of vapor carry-under occurring at high gas loads is overcome. Due to the presence of the gas passages formed by the openings 10 and the space between the parallel walls gas present in the downcomers and blocked by the liquid droplets entering into the downcomers will flow towards the walls and will escape from the downcomers via said gas passages towards a location above the froth on the trays. This gas flow will have the effect of reducing the resistance to flow of the liquid droplets and thus helping the liquid to enter into the downcomers. The liquid droplet terminal fall velocity is artificially increased due to the forced downward gas flow so that the superficial downcomer liquid velocity can increase also without risk of vapor carry-under.

Figure 2:
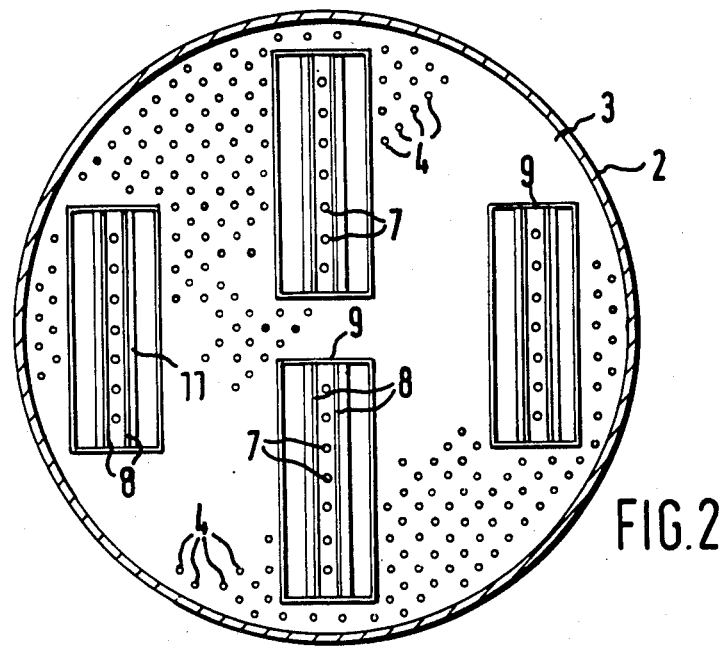
FIG. 2 shows cross section II—II of FIG. 1.
Figure 3:
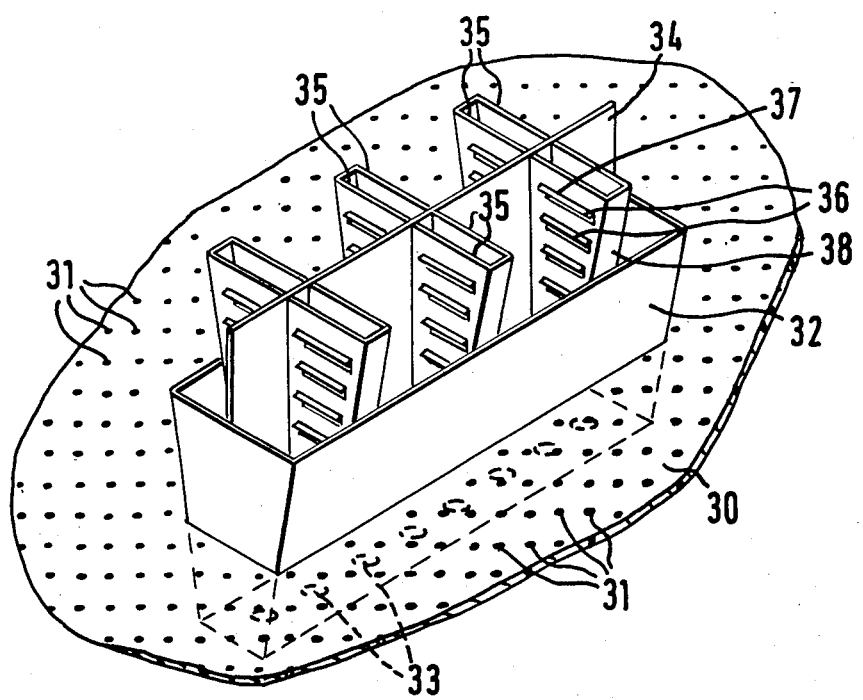
FIG. 3 shows a perspective view of a downcomer provided with gas discharge means according to the invention.

Reference is now made to FIG. 3 showing a perspective view of part of a column tray with alternative gas disengagement means. Because of the distance the gas has to travel to the disengagement means, an arrangement such as shown in FIGS. 1 and 2, would normally be preferred over the second shown embodiment.

In FIG. 3, the column tray indicated with reference numeral 30 is provided with apertures 31 for ascending gas and a plurality of oblong downcomers 32, of which one is shown, with bottom openings 33 for descending liquid. The downcomers 32 are provided with splashing baffles 34 known as such, to cause a pre-separation of gas from liquid prior to entry of the liquid into the downcomers. In this embodiment of the invention the gas passages for the escape of gas from the downcomers form an integral part of the splashing baffle supporting means. These supporting means consist of pairwise arranged walls 35 secured to the splashing baffles 34 and the sidewalls of the downcomers 32. The walls 35 are provided with openings 36 substantially uniformly distributed over the height of said walls. For protecting the openings 36 against inflow of liquid, inclined baffles 37 are arranged blanking off said openings. The walls 35 are pairwise interconnected via closed end walls 38 secured to the downcomer sidewalls. The spaces enclosed by each pair of walls 35, end wall 38 and splashing baffle 34 serve as gas passages enabling the disengagement of gas from the downcomers. Thereto the upper ends of splashing baffles 34, walls 35 and 38 extend at least above the froth of liquid and gas generated during operation.

For operation of this type of gas passages shown in FIG. 3, reference is made to the description given with respect to the embodiment of the invention shown in FIGS. 1 and 2.

The above examples of gas passages with lateral openings in the walls defining the gas passages is advantageous for operating at relatively large liquid load fluctuations wherein the liquid level in the downcomers can fluctuate largely. If a column for high pressure operations is intended to be used at a rather constant liquid load these side openings in the walls defining the gas passages may be even deleted provided that the gas entries defined by the lower ends of said walls are arranged at a level close to but at least above the level of the settled liquid in the bottom parts of the downcomers.

What is claimed is:

1. Gas/liquid contacting apparatus comprising:
   a normally vertically extending column having a plurality of substantially horizontal trays arranged one above the other in the column;
   each of said trays having a plurality of apertures for ascending gas and a plurality of liquid discharge devices for descending liquid;
   said liquid discharge devices being open at their upper ends and extending at least partly below the relevant trays with the parts of the liquid discharge devices extending below the trays being provided with bottom walls which are pierced by bottom located liquid discharge openings;
   each of said liquid discharge devices being also provided with a gas passage which (a) has at least one gas entry opening located within the lower part of the liquid discharge device, (b) has walls separated by distances such that the velocity of the upward flowing gas is small enough to permit liquid entrained in that gas to be separated from the gas by gravity flow and (c) has an outlet located substantially above the upper end of the liquid discharge device; and
   the areas of said bottom located liquid discharge openings in said liquid discharge devices being arranged for providing an aggregate area sufficient for discharging all the liquid flowing downward through the column while maintaining within each liquid discharge device a column of liquid having a hydrostatic head sufficient to prevent said ascending gas from entering the liquid discharge devices through said bottom located liquid discharge openings, so that the discharging of liquid through the bottom located openings and the separating of liquid from gas within the gas passages maintains a substantially continuous and unhindered entry of liquid into the upper ends of the liquid discharge devices.

2. Gas/liquid contacting apparatus according to claim 1, wherein the gas passages are formed by horizontally spaced splashing baffles extending over substantially the length of the discharge devices.

3. Gas/liquid contacting apparatus according to claim 1, wherein the discharge devices are provided with substantially centrally arranged splashing baffles and the gas passages are formed by horizontally spaced supporting baffles extending between the splashing baffles and the discharge devices.

4. Gas/liquid contacting apparatus according to claim 1, wherein the gas passages are further provided with a plurality of vertically spaced lateral gas entries extending over at least the lower part of said gas passages.

5. Gas/liquid contacting apparatus according to claim 4, wherein the upper ends of the lateral gas entries are bounded by downwardly inclined walls for preventing the entry of liquid.

6. Gas/liquid contacting apparatus according to claim 1, wherein the upper ends of the gas passages of a tray are arranged adjacent the next upper tray.

7. Gas/liquid contacting apparatus according to claim 1, wherein the lower ends of the gas passages are arranged closely above the bottom walls of the discharge devices.

* * * * *